Nov. 26, 1968   F. M. WOOD   3,413,653
ACOUSTIC LEAK DETECTING APPARATUS
Filed July 25, 1967
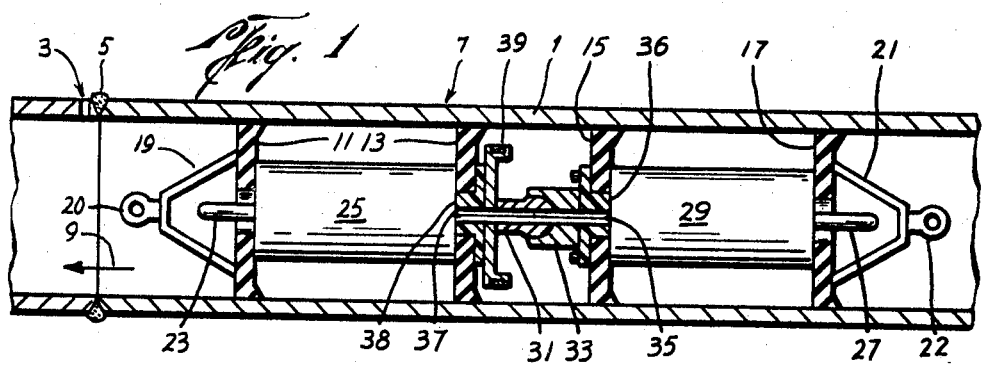
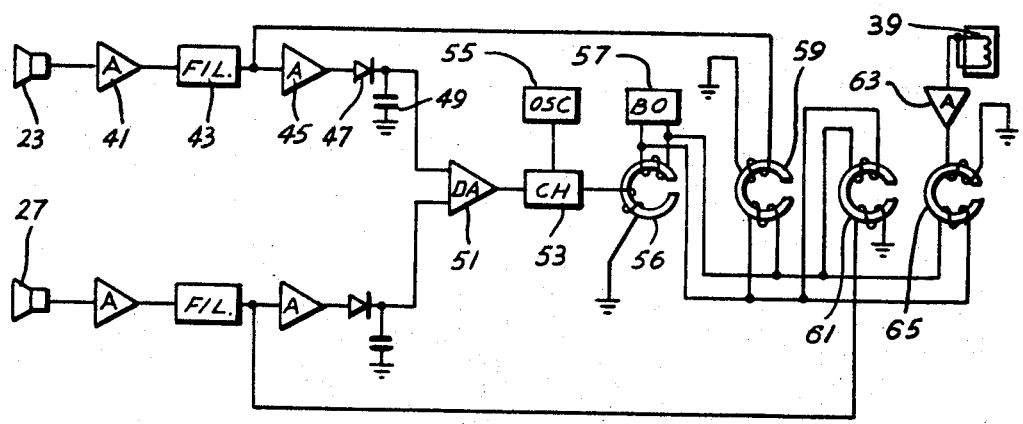
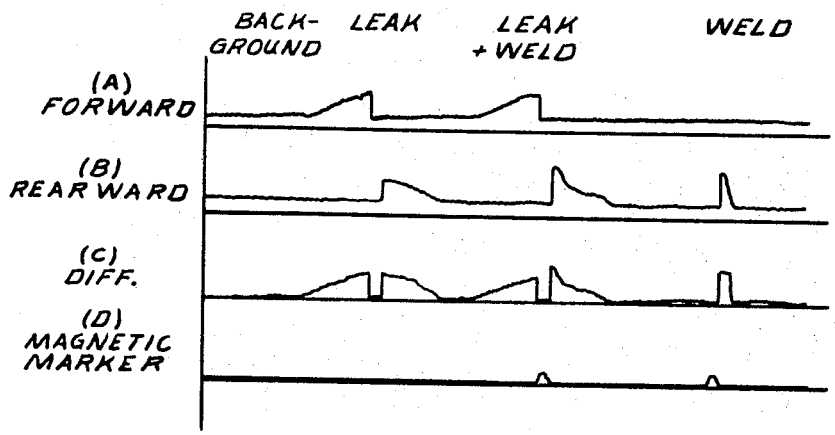
Fenton M. Wood
INVENTOR
BY Arnold, Roylance,
Kruger & Durkee
ATTORNEYS

3,413,653
ACOUSTIC LEAK DETECTING APPARATUS
Fenton M. Wood, Sugarland, Tex., assignor to American
Machine & Foundry Company, New York, N.Y., a
corporation of New Jersey
Filed July 25, 1967, Ser. No. 655,936
10 Claims. (Cl. 346—33)

ABSTRACT OF THE DISCLOSURE

This invention pertains to apparatus for passing through a pressurized pipeline and acoustically detecting leaks therein. Basically, the apparatus includes a pipeline pig having at least two resilient cups isolating at least one compartment therebetween wherein the electrical portion of the apparatus is carried, an acoustic transducer disposed at the upstream side of the pig, and an acoustic transducer disposed at the downstream side of the pipe. The electrical apparatus portion connected to the respective transducers includes suitable filters for filtering out environmental low frequencies (including those caused by the pig banging against the pipeline as it passes therethrough), a differential amplifier for cancelling the background noise not filtered out from the detected leak noise, and a multi-channel recording system for recording the output of the differential amplifier and one or both of the separate channel signals. Also, a magnetic responsive device may be included for detecting and recording magnetic field responses. From observing the developed records, the presence and location of leaks are determined.

---

This invention relates to apparatus for detecting leaks in pipelines having fluid flowing therethrough and more particularly to pig-mounted apparatus that passes through a fluid-carrying pipeline, the fluid therein being under pressure, and detects by acoustic techniques the presence of leaks in a manner that distinguishes leak-causing noise from other noises.

"Fluid" as used herein refers to fluids in either a liquid or gaseous state.

Commonly fluids, and especially gas, that flow through transmission and distribution lines escape from such lines at an appreciable loss in quantity and hence often in the loss of thousands of dollars in revenue merely because such escaping or leaking goes undetected. Moreover, in many instances the leaking of gas lines is also extremely hazardous, the accumulation of gas under sidewalks, streets, foundations and in sewers, basements and other enclosed areas resulting in explosions that have resulted in very expensive property damage and even loss of life.

Various techniques and apparatus have been developed to detect leaks and so important is it to do everything possible in order to minimize the leaks that go undetected that it is not uncommon to use a combination of the developed prior art schemes on the same pipeline in hopes that if one system fails to detect a given leak, perhaps another system will be successful. Among the schemes that are in use and which have proven to be successful to some degree are electronic "sniffers" that detect the presence of methane or other gaseous substances (injected into the pipeline especially for this purpose) that emit a detectable odor even in trace amounts. Such scheme works reliably only in enclosed areas. Further, to be highly reliable a large number of these somewhat expensive electronic "sniffers" are required.

Another scheme employed with some degree of success in detecting leaks in cross-country pipelines is the use of aerial surveys that detect dead vegetation. The several shortcomings to this scheme are the expense involved, the unreliability in the absence of vegetation (such as when a pipeline goes underneath a roadbed—where pipeline leaks often occur), the delay in detection while the vegetation is dying, and the likelihood that small leaks may not cause vegetation to be noticeably affected at all.

Also, instrumented pipeline pigs have been employed utilizing a number of schemes. One scheme that is reflected in the prior art is the attempted detection of pressure drops in the vicinity of leaks by isolating a compartment or chamber within the pig as it moves through a line and detecting the difference in pressure within the compartment with the pressure without. The inability to successfully isolate a compartment in the presence of irregular surfaces and projections (sometimes known as "icicles") at the junctions of pipeline joints, etc., makes such schemes suspiciously unreliable. Also, the rapid movement of the pig through the line often does not allow a measurable pressure difference to develop at a relatively small leak in the time that it takes the pig to pass there opposite.

Temperature sensitive devices have also been attempted to exploit the phenomenon that there is normally a change of temperature near the area of a leak caused by the rapid expansion of the fluid under pressure as it escapes through the pipeline breach. Again, as with the pipeline pressure detecting devices, the inability to achieve effective isolation of a compartment within the pig and the speed of the moving pig past a small leak makes temperature sensing devices only partly reliable.

A very promising phenomenon that has been attempted to be exploited to some extent, but heretofore without a high degree of reliable success, is the detection of the noise that occurs as the fluid under pressure escapes through a leak. Although it has been long known that fluid leaking under pressure produces sound waves in the pipeline fluid which manifest themselves as noise, instrumented pigs using acoustic transducers for detecting this noise have not been highly successful for a number of reasons. First, the environmental noise in relation to the noise associated with the leak is often so large that the meaningful noise cannot be distinguished from that which has no meaning. This trouble is particularly noticeable at railroad crossings, highway crossings, in the vicinity of blasting and other frequent large noise occurrences, and near airplane traffic routes. These interfering noises often saturate the detectors and amplifiers so that any noise in addition to the environmental noise has no effect whatsoever. It is often that the source that produces the background noise and prevents detection of leak noise is also the possible producer of ground shocks or ground swells that result in pipeline breaks.

Another problem with the prior art acoustical detectors is that the resilient cups that enable the pigs to be translated through the pipeline make slapping noises as they pass over the welds, joints and other internal projections or "icicles" in the pipeline. It is often at these locations that there is a leak (since it is at these locations that there is a seal, and no seal method has been developed which is 100% effective), but because of the reverberations of the cups and their detection by the acoustics detectors, any noise caused by leaks is completely covered up.

To be sure, acoustic detectors have been employed and recordings have been produced using acoustic detectors mounted on pipeline pigs, but none of the prior art acoustic detectors so mounted has found commercial favor because of the highly unreliable nature of the traces that are developed, which have doubtful meaning as to what they show and as to what they fail to show.

Therefore, what is described herein generally is an improved acoustic leak detector for discovering breaches in a pipeline having fluids flowing therein under pressure which takes advantage of the acoustics phenomenon accompanying a pipeline leak, but which ingeniously overcomes the shortcomings of all of the known devices to effectively eliminate the effects of other noise. Generally, the described apparatus comprises forward and rearward resilient cups joined together in pig-like form to create at least one isolation compartment therebetween, an acoustic detector disposed in front of the forward cup and another acoustic detector or transducer disposed behind the rearward cup, frequency sensitive filters, amplifiers and detectors connected to each transducer to screen out as much background noise as possible, a differential amplifier operably connected to receive the two resulting outputs (from the front and rear transducers) after such preliminary frequency screening to produce a difference output, and recording means including frequency converters, etc., for recording the developed difference signal.

Also recorded simultaneously with the difference signal may be the signals from each individual transducer channel and a signal developed from a magnetic detector (responding to the magnetic field accompanying each welded joint or other magnetic field within the wall of the pipe). By observing the recordings, it is readily possible to distinguish the noise caused by pipeline leaks, breaches and the like from background noise and from pig-noise resulting from the instrument riding over internally projecting structures from the pipe wall. The principal reason for this result is that the environmental noise detected equally by both transducers is effectively cancelled out in the differential amplifier and the resulting noise that is not indicative of leak noise (namely, the noise of the pig banging against the pipe) is detected by only the rear transducer and not by the front transducer because of the isolation operation of the compartment between them.

As a result of the combined structural and functional operation of the apparatus of the invention described and claimed herein, more reliable and meaningful indications of leaks in pipelines having fluid flowing therein under pressure are made than ever before achieved.

So that the manner in which the above-recited advantages and objects of the invention, as well as others which will become apparent, are attained can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the drawings:

FIG. 1 is a cross-sectional view of an illustrated embodiment of the invention in use.

FIG. 2 is an electrical block diagram of a preferred electrical portion of the embodiment shown in FIG. 1.

FIG. 3 is a group of related typical waveforms that may be developed and recorded in accordance with the present invention.

Now referring to the drawings, and first to FIG. 1, a portion of a typical pipeline 1 containing fluid, typically gas under pressure, is shown. A breach or leak 3 is shown in the pipe wall at one side of field weld 5. Instrumented pig 7 is shown within pipeline 1 which is being translated in a direction 9 from right to left in the drawing. Pig 1 is supported within the pipeline and is translated therethrough by four resilient cups 11, 13, 15 and 17, each of which transversely spans the internal diameter of the pipeline and is shaped so as to entrap the fluid moving within the pipeline and move the instrumented pig therethrough in conventional manner.

Secured at the upstream side of forward resilient cup 11 is a protection cage 19, for allowing fluid to pass freely therewithin but which protects any items disposedly located within the cage from being damaged by solid articles and projections within the pipeline that would otherwise come in contact against the items. Because, however, the cage permits the free passage of fluid, the items located therewithin are still subjected to the environmental conditions of the pipeline. The cage also provides a convenient structure in which a lift eye 20 may be formed.

Similarly, secured downstream at the rearmost resilient cup 17 is another protection cage 21 with a lift eye 22 substantially identical to cage 19. Again, fluid may flow freely within the cage, but any items located therewithin are protected from solid articles and projections located within the pipeline.

Located within cage 19 is a microphone, hydrophone or other acoustic transducer 23 which is capable of responding or detecting the environmental acoustic energy over a wide band or range of frequencies. Acoustic transducer 23 is electrically connected by a wire or other conductor through the resilient cup 11 to an instrument 25 located therebehind.

Similarly, an acoustic transducer 27 having substantially the same characteristics as transducer 23 is located within cage 21 to respond to the same wide band of frequencies as transducer 23. Connection is made from acoustic transducer 27 through resilient cup 17 to another instrument chamber or compartment 29 in a manner similar to that for transducer 23.

Chamber or compartment 25 may conveniently be a battery pack or other source of electrical energy for operating the circuit to be hereinafter described. Further, it provides a means for joining resilient cup 11 with resilient cup 13 to secure them together in a fixed spatial relationship. Likewise, compartment 29, which may conveniently be a compartment housing the electrical operating and recording mechanisms to be described, secures resilient cups 15 and 17 together in a fixed spatial relationship.

Located between cups 13 and 15 is typically a universal joint comprising a ball portion 31 and a socket portion 33. This type joint allows the instrumented pig to more conveniently pass by turns and bends in the pipe than would otherwise be possible. There is a central longitudinal opening through both sections or portions of the universal joint and through cups 13 and 15 located on either side thereof. In fact, cup 15 includes an opening which has located within it by cementing, bolting or otherwise a rubber gasket 36 which houses pressure type electrical connector 35. This type of connection ensures that the cups effectively pressure seal the compartment (and hence the components located within the compartment) against harmful leakage from the fluid within the pipeline.

Similarly, cup 13 includes a central opening in which is located rubber gasket 38 housing electric pressure connector 37. Appropriate interconnection is made between connectors 35 and 37 through not only the gaskets but also through the longitudinal central openings of both halves of the universal joint.

Finally, attached to the downstream side of gasket 38 by cementing or otherwise is located a magnetic marker coil assembly 39. Typically, this assembly is comprised of a circular rubber disk which encases turns of a coil, the coil turns transcribing an annulus having a diameter that locates it as near to as is practical to the inside surface of the pipe when the pig is in use, considering that the resilient cups must flex somewhat as the pig is translated through the pipe during leak-inspection operation. The cups act as suitable centralizers so that magnetic fields may optimumly be detected. In addition, auxiliary centralizers (not shown) may be used.

FIG. 2 illustrates a preferred electrical embodiment which may be jointly housed within the electrical compartments 25 and 29. For purposes of discussion since compartment 25 was described as housing the power supply, it may be assumed that the entire electrical circuit other than the power supply is housed within compartment 29. Electrically connected to the two acoustical-to-electrical transducers 23 and 27 are identical channels comprising an amplifier, a filter which blocks low frequencies, another amplifier and a detector diode assembly. For instance, the wide-band electrical signals which are detected by the forward transducer 23, typically the range of frequencies from 5 to 50,000 Hz., are passed through video amplifier 41 which acts to buffer the output of detector 23 from the operation of the subsequent electrical circuits and to amplify the detected signal over a wide band of frequencies. The output of amplifier 41 is supplied to filter 43, which may be conveniently a band pass filter or a high pass filter. In either event, the low frequency signals associated with most background noise are filtered out, leaving the high frequency background noise plus the frequencies most often associated with pressure leaks in pipelines.

As a convenient aid in amplifying the meaningful signals with respect to those having no meaning, it has been found expedient to use a logarithmic gain amplifier of a conventional type at amplifiers 41 in each of the transducer channels. A logarithmic gain amplifier is merely a standard Class A amplifier with a logarithmic response voltage divider use as an interstage coupling, such as shown on p. 671 of "Waveforms," Radiation Lab Series 19, published by McGraw-Hill.

It should be noted that most low frequency interfering noises are predominantly in the range of 200 Hz. or lower. On the other hand, a typical gas methane has a sound velocity of 430 meters per second at one atmosphere and only a few percent higher velocity at 50 atmospheres. The frequency of the escaping sound is inversely proportional to twice the pipe diameter. Therefore, the frequency of the noise caused by methane escaping through a pipeline leak is equal to 430 meters per second divided by .5 meter (for a pipe having an internal diameter of on the order of ten inches). This would mean that the frequency would be 860 Hz., which is readily filterable from the 200 Hz. frequency of the interference signals. As shown above, since the approximate frequency of the leaking gas is calculable, a band pass filter may be preferable to a high pass filter. Such a filter would minimize those signals both high and low which are outside of the range of useful meaning.

In any event, the output of filter 43 is applied to a tuned amplifier 45 for boosting the range of signals within the range of the output of the filter. This amplifier then supplies its output to a diode detector assembly, including diode 47 and capacitor 49. For convenience, diode 47 is connected with its anode at the input side, and capacitor 49 is connected from the cathode of the diode to ground. This means that all positive signals within the detected range above a certain value cause the diode to conduct and stores energy on capacitor 49, resulting in an essentially direct current output, the level of which is indicative of the strength of the signals received within the range of leak-noise frequencies detected.

A similar chain of circuits to that just described is associated with transducer 27, resulting in an output which is similar to that just described, except that the output here is related to the sounds detected by transducer 27 at the rear of the instrumented pig.

Differential amplifier 51 receives both detected direct current signals and produces a DC output which is the difference between them. Differential amplifiers are common in the art, and any suitable amplifier of that type exhibiting the normally high common mode rejection is operable in this circuit. The output of differential amplifier 51 may be applied to a chopper circuit 53, driven by a fixed frequency oscillator 55, to thereby convert the DC signal out of amplifier 51 to an AC signal. A modulator may be used in place of chopper 53.

A magnetic recording head receives the output from chopper 53 along with a bias frequency from a biasing oscillator circuit 57. The recording tape or drum passing with respect to the magnetic head may be either driven at a constant speed or at a varying speed dependent upon the speed with which pig 7 is translated through the pipeline, as determined by a speed monitoring device such as a roller in contact with the inside surface of the pipe.

For convenience in interpreting the data which is developed by magnetic recording head 56, the output of each individual channel may also be applied to other similar recording mechanisms. For instance, the output of filter 43 in the channel including transducer 23 may be applied to magnetic head 59. Likewise, the output from the filter in the channel including transducer 27 may be applied to a recording head 61. The bias frequency for each of these recording heads may be obtained from the same bias oscillator 57 as was used for biasing magnetic head 56.

Finally, the magnetic marker coil signal, derived from the magnetic fields detected by marker coil 39 (which are those magnetic fields within the wall of the pipe and particularly to such fields that remain at electric weld locations along the pipeline), is amplified by amplifier 63 and applied to a fourth magnetic head 65. Again, this magnetic head may also be biased by the output of bias oscillator 57.

It is assumed for purposes of discussion that the recording means, which is typically a recording tape, is synchronized with respect to all of the magnetic heads. Although delay circuits are not shown in any of the particular channels to the magnetic heads, such circuits may be used, if desired. Also, instead of magnetic recording heads, galvanometer instruments may be used, if desired.

Now turning to FIG. 3, a series of waveform envelopes are shown which may be typical of those developed at magnetic recording heads 56, 59, 61 and 65. In the discussion of the waveforms, it is assumed that no delay circuits are used, although as indicated above, delay circuits may be used, if desired, to create a little different series of indications (for instance, compressed so that the signals detected by each of the detectors appears in line on the record, rather than offset slightly because of their physical juxtaposition).

Recorded on line 1 (FIG. 3A) is a typical waveform envelope that may be developed on recording head 59, which receives its input from the output of the recording channel associated with forward transducer detector 23. FIG. 3B is the representation that may be developed on recording head 61, which receives the signal from the rearward mounted transducer detector 27. FIG. 3C is the signal envelope that may be developed after differential amplifying and chopper action has occurred and which is applied to magnetic recording head 56. Finally, FIG. 3D depicts the signal which may be developed by magnetic coil marker 39 and associated circuits and applied to magnetic recording head 65.

It may be further noted that, for purposes of discussion, the four waveforms illustrate action in the presence of four separate conditions, namely, (1) in the presence of ordinary background noise reception, (2) in the presence of a leak, (3) in the presence of a leak plus a weld, and (4) in the presence of a weld having no leak associated therewith. Also, for purposes of discussion, the four waveforms are assumed to be synchronized as they would be in an actual recording situation.

When the instrumented pig 7 is being translated in an area in which there are no leaks or obstructions of any kind within the pipeline, a general background noise will be detected and produced on magnetic recording heads, even following the filtering of much of the low frequency interfering noise, as explained above. This noise is presented substantially equally as wiggly lines in FIGS. 3A and 3B, producing a differential output which is essentially zero, as shown in FIG. 3C (although there may also be a slight wiggly line here, also).

As the pig approaches the vicinity of a leak, the detected leak noise will gradually represent an additional signal superimposed on the background noise received by the forward transducer. This gradually increasing signal is shown in FIG. 3C under the area marked "Leak." The shape of the waveform is the way it is since signal loss is a function of the distance travelled by the signal through the pipeline.

As soon as the first resilient cup passes the leak area and isolates the transducer from the leak, the signal on line 3A returns to background level. While the leak is within the limits of resilient cup 11 and 17, the signal produced by the rear transducer is not affected. Eventually the leak passes cup 17 (is downstream therefrom), at which time a very high level noise signal will be superimposed upon the background signal which normally exists. As the pig moves further away from the leak, the leak noise will gradually fade until only the background noise again remains.

Since the differential amplifier will have an output when either the forward transducer signal or the rear transducer signal is detecting a leak, a signal such as shown in FIG. 3C is developed on magnetic recording head 56 while the individual channel signals are being developed as shown in FIG. 3A and FIG. 3B. This signal in essence is a combination of what is shown in FIGS. 3A and 3B about an essentially zero background indication.

Although the waveform representation in FIG. 3C shows that the superimposed leak noise is a positive superimposed waveform, it is possible that the differential amplifier chosen for differential amplifier 51 may instead be the type that produces a positive output when the applied signal from the channel associated with transducer 23 is larger than the applied signal from the channel associated with transducer 27, but produces a negative signal when the applied signal from the channel associated with transducer 23 is smaller than the applied signal from the channel associated with transducer 27.

Now turning to the third vertical column of FIGS. 3A, 3B and 3C, the waveforms are shown that are developed when a leak occurs at a weld. For instance, up until the time that the pig arrives at the weld, where the leak is occurring, the leak indication is the same as for a leak by itself. This waveform, as indicated above, will be in FIG. 3A a gradually increasing superimposed noise signal upon the background signal until the time that the resilient cup passes by the leak. At this time, a zero leak noise output will be produced both at the forward transducer and from the differential amplifier (FIG. 3C), since the rear transducer is not yet within receiving range of the developed noise.

When the leak and weld together pass by resilient cup 17 (the rear cup), a slapping noise occurs that is reflected by a spike added to the noise signal, which is in turn superimposed upon the background signal, as indicated by the FIG. 3B representation in the "Leak+Weld" column. As a result of this action, the output of the differential amplifier will be as shown in FIG. 3C, which shows the gradually increasing leak noise followed by the notch (while the leak and weld are within the confines of the compartment defined by resilient cups 11 and 17), followed by the spike caused by the cup slapping over the weld, followed by the decaying noise resulting from the gradual parting of the rear transducer from the leak.

If a weld only occurs, no leak being present at the weld, a signal will be developed as shown in the "Weld" column for each of the recording heads. Transducer 23, the forward transducer, will not detect a signal of any kind other than the background signal, and therefore only the background noise is developed in FIG. 3A. Rear transducer 27 develops a spiked signal at the time resilient cup 17 passes by the weld, as shown in the "Weld" column of FIG. 3B. Similarly, FIG. 3C shows that the differential amplifier also develops a spiked signal, since there is nothing in the forward transducer channel to balance against the signal which is detected by the rearward transducer.

FIG. 3D shows the signal which is developed by the magnetic marker coil 39, which is merely a spiked output at the occurrence that the coil passes by the magnetic field remaining within the welds, as shown.

As is readily apparent, by investigating the distinctive characteristics of each of the waveforms and comparing them with each other, it is possible to ascertain if there is a leak in the line and if the leak is occurring at or near a weld or some artificially inserted magnetic field. For instance, if it has been determined that the welds are not retaining a magnetic field, or if the spacing of such welds is such to make physical correlation of the record and the pipeline difficult, it is possible to place a magnet at the outside of the pipeline at some known location at a weld or otherwise and produce a magnetic mark such as shown in FIG. 3D. When this is done, it is possible to locate the physical leak, as indicated by the recordings that are made with respect to the magnetic mark shown on FIG. 3D.

Although the waveforms show that a distinctive pattern for either the signal received by the forward transducer or the rearward one, apparently making it possible to locate leaks without having to use the differential amplifier scheme just described, such is really not the case in many common situations. First, the background noise is often irregular and has appreciable amplitude with respect to the leak-noise indication. In such instances, a single transducer channel waveform by itself is deceptive in that some swells in the waveform appear to indicate leaks, other swells may cancel (happen to oppose the amplitude of the leak noise) real leak noise indications and still other background swells may just cover up the real leak noise by being many times larger than the leak noise amplitudes.

In view of the fact that background noise may be really noisier than the leak noise indication making the differential indication shown in FIG. 3C the only meaningful one, it may be desirable to exclude any delay in either channel (as mentioned above was a possibility) so that the background noise would remain exactly synchronized to effect more certain cancelling in the differential amplifier.

It should be noted that if the cups are made very soft and resilient, the frequency caused by the cups passing by internal projections will be at a lower frequency than if the resilient cups are made hard, such that they immediately snap back as soon as they pass by an internal projection. Therefore, to help make filtering more certain, it is advisable to make the resilient cups as soft as practicable, considering their ability to translate the pig through the pipeline and satisfactorily resiliently conform to the encountered irregular contours of the internal pipeline surface.

It should be noted also that within the pig illustrated in FIG. 1 there are three compartments, namely, between cups 11 and 13, between cups 13 and 15, and between cups 15 and 17. Actually, a more simplified version of a pig may be appropriate in any particular given installation. All that is actually required to be operable is the effective isolation of an appreciable amount of leak noise past the resilient cups. This has been found to be accomplishable by two search cups fixed apart to form one compartment between the forward and rear transducers.

Further, it should be noted that one of the big advantages to using acoustical transducers in the manner described, which is not available when using pressure-sensitive transducers or temperature-sensitive transducers, is that the isolation compartment developed by the cups against the internal pipewall does not have to be as leakproof or pressure-tight as when other types of transducers are used. This is merely because if the compartments achieve an appreciable amount of shielding of one end of the pig from the other, sufficient attenuation of the leak noise is obtained that the resulting detection occurs as above described. Even if all four of the cups shown in FIG. 1 are simultaneously opposite internal projections, such as a weld seam bead, so as to allow some noise to pass therearound, the resulting possibility is exceedingly remote that the noise detected by transducer 23 and the noise detected by transducer 27 caused from a leak located to one side of the pig would produce a differential showing that there was no leak. In other words, there would still be an indication on FIG. 3A which would not be shown on FIG. 3B.

It should also be apparent that because fundamental frequencies of leak noise are calculable, other techniques besides filters can be used to detect either the fundamental or the harmonic, such as an autocorrelator. The delay time of such an autocorrelator would be approximately twice the pipe diameter divided by the velocity of sound of the gas. For example, 430 meters per second at one atmosphere for methane. A typical autocorrelator is shown in U.S. Patent Wood, 3,295,363.

It may also be that for a particular fluid and for a particular diameter of pipe, the fundamental frequency of ground frequency range and would be readily detectable, even though possibly at a lower energy level than the the noise at a leak may be too close to the noise of the background for being readily filterable. In such event, a harmonic of that frequency would be beyond the background frequency of the noise.

While only one physical embodiment and one electrical embodiment have been shown and described, although modifications of the invention have been discussed, it is obvious that there are other substitutes and changes of structure which may be made without varying the scope of the invention.

What is claimed is:

1. Acoustic leak detection apparatus for being propelled internally through a pipeline in which fluid is flowing under pressure, comprising
    forward and rearward fluid entrapping means transversely spanning the central opening of the pipeline, each entrapping means resiliently conforming with the encountered irregular contours of the internal pipeline surface, said entrapping means being fixedly spaced apart to provide an isolation compartment therebetween,
    a first acoustic transducer secured to said forward fluid entrapping means on the upstream side thereof, said first transducer producing an electrical signal proportional to the detected environmental noise,
    a second acoustic transducer secured to said rearward fluid entrapping means on the downstream side thereof, said second transducer producing an electrical signal proportional to the detected environmental noise, and
    differential means operably connected to receive the signals from said first and second transducers and producing an output indicative of the difference therebetween, an appreciable resulting output indicating a likelihood of noise caused by a leak in the pipeline.

2. Acoustic leak detection apparatus as described in claim 1 and including
    first recording means connected to said differential means, and
    second recording means sychronized with said first recording means operably connected to receive the signal from said second acoustic transducer, simultaneous outputs on said first and second recording means indicating the likelihood of said entrapping means slapping against an internal projection from the pipeline surface.

3. Acoustic leak detector apparatus as described in claim 1, and including
    magnetic detector means for producing an electrical output signal upon encountering areas of residual magnetic fields along said pipeline,
    first recording means connected to said differential means, and
    second recording means synchronized with said first recording means operably connected to receive the signal from said magnetic detector, simultaneous outputs on said first and second recording means indicating the likelihood of leak occurring at a welded transverse seam in the pipeline, said seam having a remaining residual field therein.

4. Acoustic leak detection apparatus as described in claim 1, and including
    first frequency blocking means for removing interfering low frequencies from the output of said first acoustic transducer before operable connection to said differential means, and
    second frequency blocking means for removing interfering low frequencies from the output of said second acoustic transducer before operable connection to said differential means.

5. Acoustic leak detection apparatus as described in claim 4, and including
    first detector means operably connected to said first frequency blocking means for producing a DC voltage proportonal to the high frequency input signal received,
    second detector means operably connected to said second frequency blocking means for producing a DC voltage proportional to the high frequency input signal received, said detector means causing the output from said differential means to be a DC voltage,
    converting means for converting the DC output voltage from said differential means to an AC voltage suitable for driving a magnetic recording head, and
    magnetic recording means including a magnetic recording head connected to receive the output from said converting means.

6. Acoustic leak detection apparatus as described in claim 5, wherein said converting means is a chopper.

7. Acoustic leak detection apparatus as described in claim 5, wherein said converting means is a modulator.

8. Acoustic leak detection apparatus for being propelled internally through a pipeline in which fluid is flowing under pressure, comprising
    at least one fluid entrapping means transversely spanning the central opening of the pipeline, the entrapping means resiliently conforming with the encountered irregular contours of the internal pipeline surface,
    a first acoustic transducer secured to said fluid entrapping means on the upstream side thereof, said first transducer producing an electrical signal proportional to the detected ennvironmental noise,
    a second acoustic transducer secured to said fluid entrapping means on the downstream side thereof, said second transducer producing an electrical signal proportional to the detected environmental noise, and
    differential means operably connected to receive the signals from said first and second transducers and producing an output indicative of the difference therebetween, an appreciable resulting output indicating a likelihood of noise caused by a leak in the pipeline.

9. Acoustic leak detection apparatus for being propelled internally through a pipeline in which fluid is flowing under pressure, comprising
    forward and rearward fluid entrapping means transversely spanning the central opening of the pipeline, each entrapping means resiliently conforming with the encountered irregular contours of the internal pipeline surface,
said entrapping means being fixedly spaced apart to provide an isolation compartment therebetween,
a first acoustic transducer secured to said forward fluid entrapping means on the upstream side thereof, said first transducer producing an electrical signal proportional to the detected environmental noise,
a second acoustic transducer secured to said rearward fluid entrapping means on the downstream side thereof, said second transducer producing an electrical signal proportional to the detected environmental noise,
first filtering means connected to said first acoustic transducer for filtering out the undesirable low frequency background noise from the meaningful leak-producing noise,
second filtering means connected to said second acoustic transducer or filtering out the undesirable low frequency background noise from the meaningful leak-producing noise, and
differential means operably connected to receive the signals from said first and second filtering means and producing an output indicative of the difference therebetween, an appreciable resulting output indicating a likelihood of noise caused by a leak in the pipeline.

10. Acoustic leak detection apparatus as described in claim 9, wherein said resilient entrapping means is of sufficiently soft material to cause a low frequency noise when passing over the irregular contours of the internal pipeline surface that may be effectively filtered by said second filtering means.

References Cited

UNITED STATES PATENTS

| | | | |
|---|---|---|---|
| 2,884,624 | 4/1959 | Dean et al. | 73—40.5 XR |
| 3,192,516 | 6/1965 | Simpkins et al. | 73—40.5 XR |
| 3,196,686 | 7/1965 | Cole | 73—40.5 XR |
| 3,264,864 | 8/1966 | Reid et al. | 73—40.5 XR |
| 3,308,424 | 3/1967 | Simpkins et al. | 73—40.5 XR |

S. CLEMENT SWISHER, *Acting Primary Examiner.*

J. NOLTON, *Assistant Examiner.*